Feb. 11, 1969 R. COHN 3,427,017
SHEET ALIGNING MECHANISM
Filed Jan. 13, 1967 Sheet 1 of 2
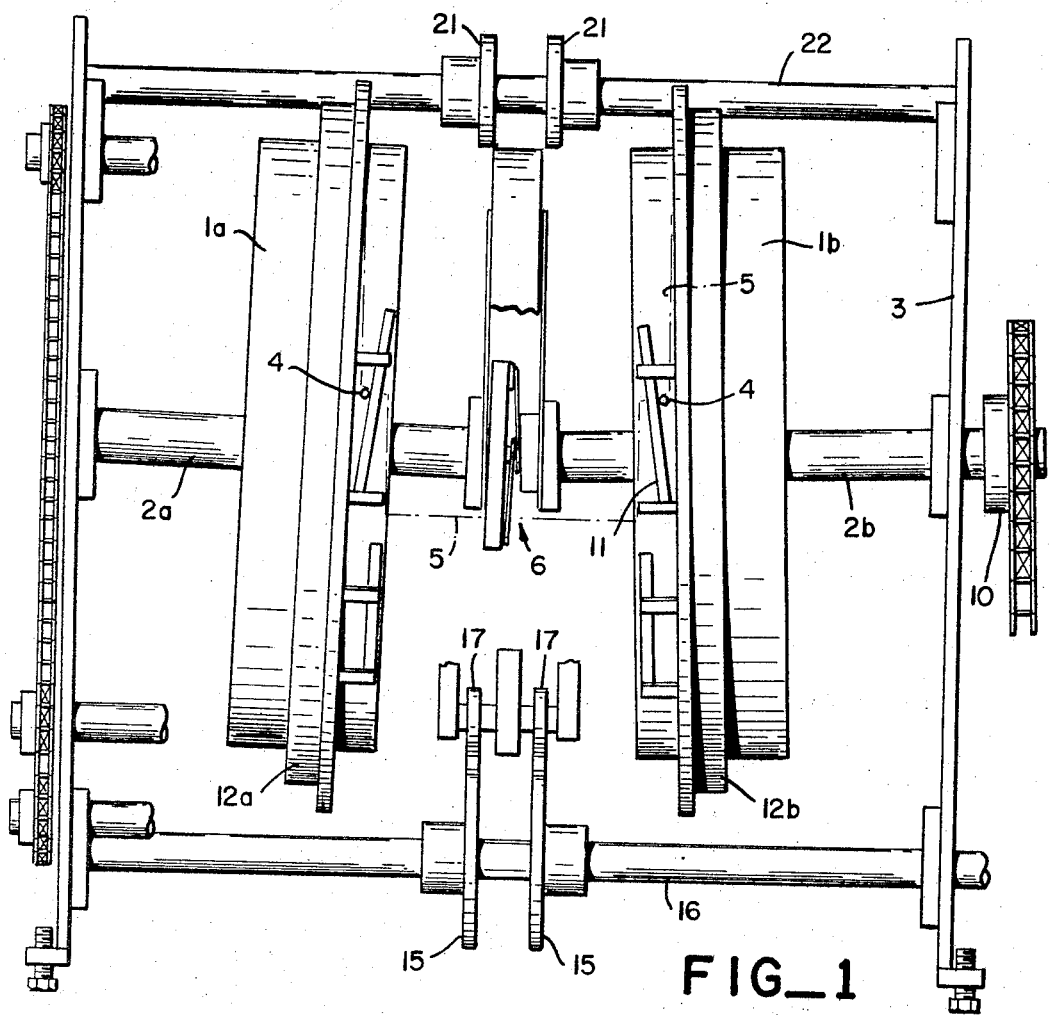
FIG_1
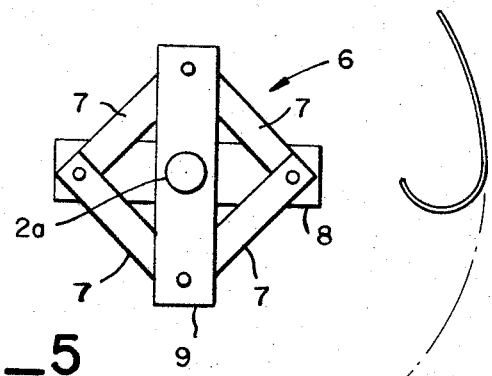
FIG_5
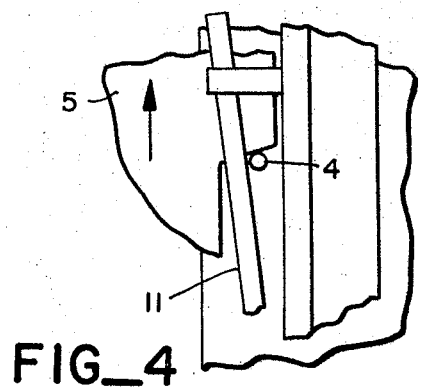
FIG_4
INVENTOR.
ROBERT COHN
BY 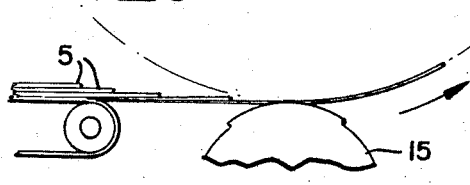
ATTORNEYS

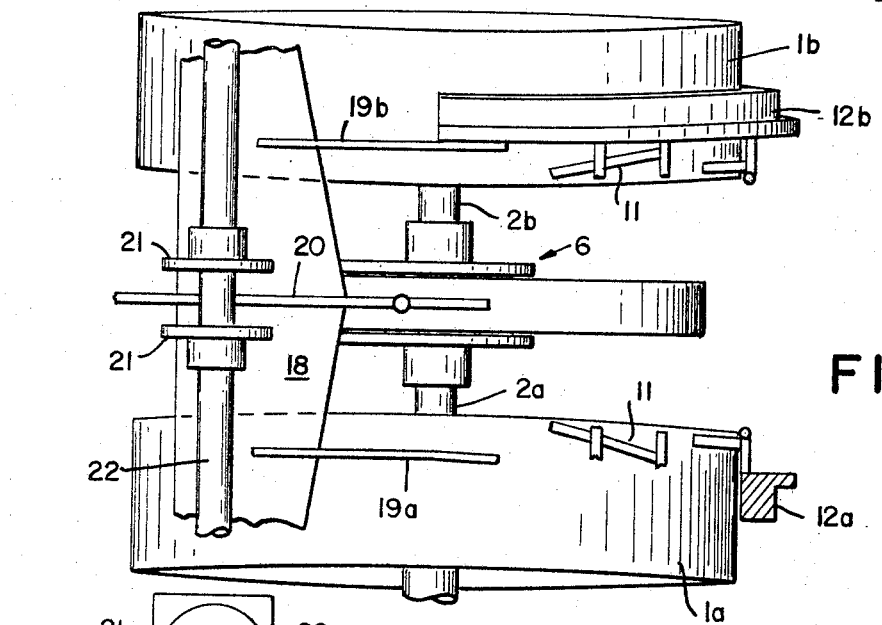
FIG_2
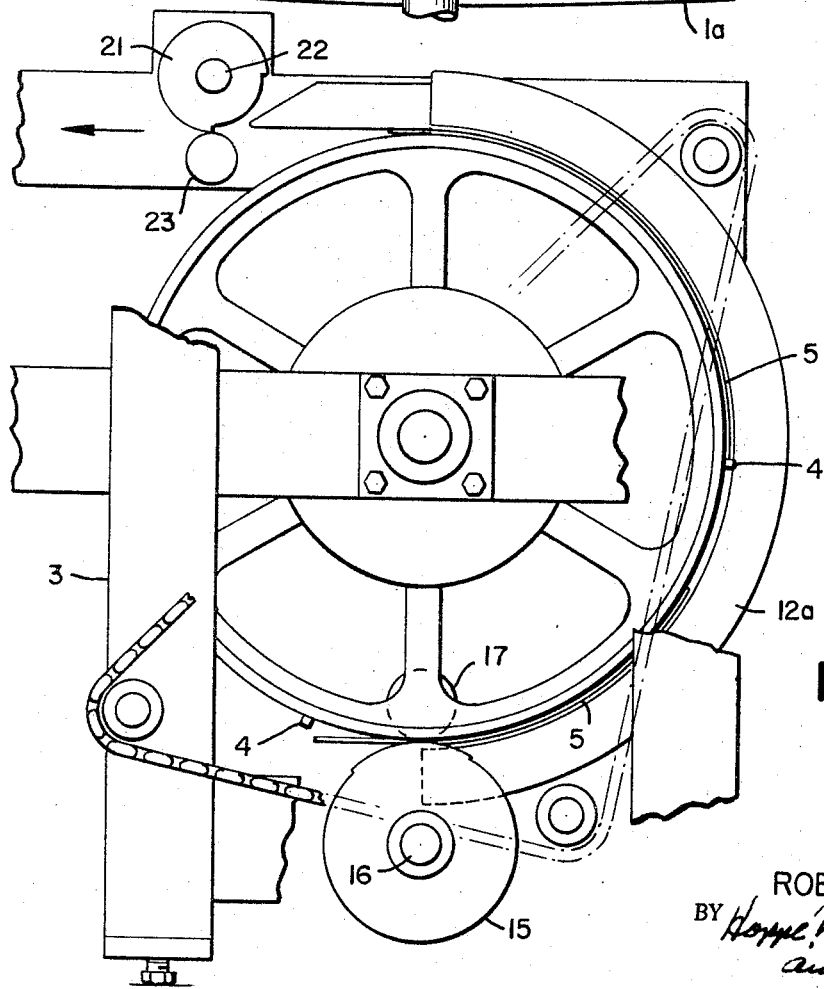
FIG_3
INVENTOR.
ROBERT COHN 3,427,017
SHEET ALIGNING MECHANISM
Robert Cohn, Millbrae, Calif., assignor to Nationwide Papers Incorporated, Knightsbridge, Ohio, a corporation of Ohio
Filed Jan. 13, 1967, Ser. No. 609,176
U.S. Cl. 271—2                                      5 Claims
Int. Cl. B65h 5/16, 9/08

ABSTRACT OF THE DISCLOSURE

This invention is an aligning mechanism which provides at least a pair of aligning pins that periodically converge upon a centering plane and align sheet material upon that plane.

---

The invention relates generally to aligning mechanisms for sheet material in envelope machines, printing machines or the like. The described mechanism includes a pair of synchronized rotatable but non-axially aligned wheels which rotate in non-parallel planes. Each wheel carries at least one alignment pin along its periphery. A corresponding pair of pins, one from each wheel, engages the trailing edge of an envelope blank, for example, at a divergent side of the wheels and discharges the blank at a convergent side of the wheels centered upon a plane passing through the intersection of the two planes which the pins define as they are carried around the wheel peripheries.

An object of this invention is to provide at least a pair of alignment pins which in fixed relationship periodically converge upon a centering plane.

Another object of the invention is to provide a simple aligning mechanism which eliminates chains and pins as well as the attendant shift in pin location which results from chain or guide wear.

A further object of this ivnention is to provide an improved aligning mechanism for blanks of sheet material which is operable at high production speeds and is easily adjusted and maintained.

Other objects and advantages of the mechanism will be apparent upon a consideration of the following description and the accompanying drawings in which:

FIG. 1 is an end elevational view of the centering mechanism mounted on an envelope machine;

FIG. 2 is plan view of the centering mechanism with some of the envelope machine parts broken away for clarity of illustration;

FIG. 3 is a side elevational view partly in section;

FIG. 4 is an enlarged detail plan view illustrating the aligning pins in cooperation with a tabbed envelope blank; and FIG. 5 is an elevational view of the flexible coupling between the centering wheel axles used in the described embodiment of the invention.

The mechanism comprises a pair of spaced rotatable aligning wheels 1a, 1b. The wheels rotate on axles 2a, 2b, respectively, journaled in bearings mounted on the machine frame 3. The rotational axes of the axles lie in the same horizontal plane but are not coincident. The axes intersect at a point between the wheels. The planes of rotation of the aligning wheels 1a, 1b, therefore, are not parallel but converge at a discharge side which is at the top of the wheels and diverge at a loading side which is at the bottom of the wheels.

Each of the wheels carries one or more spaced peripheral pins 4, a corresponding pair of which engage the trailing edge of an envelope blank 5 or other cut sheet fed toward the divergent side of the wheels at the bottom as shown in FIG. 3. By virtue of the non-parallelism of the rotating wheels 1a, 1b, the pins 4 periodically converge toward the vertical plane, or centering plane, between the wheels at which the axes of rotation intersect. In other words, each pair of corresponding alignment pins traces paths lying in intersecting planes. The pins periodically converge upon and diverge from the centering plane which passes through the intersection of these planes as well as the point of intersection of the wheel rotational axes. Hence, the pins center each envelope blank upon the centering plane.

Successive peripheral pins on each wheel are spaced to accommodate the width of the blank to be aligned. The successive pins align the next sheet in the same manner. The pins may be flat lugs or a pair of spaced pins at each aligning location to accommodate square or rectangular blanks rather than the tabbed blanks illustrated in the drawings.

In the illustrated embodiment flexible coupling means 6 joins axles 2a, 2b between the two wheels. This synchronizes rotation of one wheel with the other and eliminates radial backlash. The coupling shown in detail in FIG. 5 comprises four rectangularly pinned flexure members 7. Rigid bar 8 flanged to the end of axle 2b joins an opposite pair of the pinned flexure corners. A similar rigid bar 9, which is flanged to axle 2a, joins the other two corners of the rectangularly arranged flexure members 7. Drive means 10 rotates directly alignment wheel 1b. It indirectly through coupling 6 rotates alignment wheel 1a.

A plurality of leaf spring means 11 depend upon guide rims 12a, 12b, respectively, which partially embrace and are spaced from the periphery of each of the alignment wheels. The free end of each spring means presses the transported sheet against the wheel surface as the sheet passes beneath them.

A pair of driven feed segments 15 or feed wheels rotate on feed shaft 16, which is also journaled in bearings on the frame 3. By engagement with feed idler roll 17 and in cooperation with guide rims 12a, 12b they intermittently move each of a series of sheets up around the lower periphery of the alignment wheels at their divergent side until corresponding pins 4 on each of the wheels engage the trailing edge of the sheet. The moving pins then transport each blank up and around the path of the wheel periphery to the convergent side of the wheels. As the pins converge they center each sheet on the vertical plane which passes through the intersection of the wheel axes and the intersection of the planes defined by the path of pin travel.

The forward edge of each sheet 5 passes over horizontal guide plate 18 under guide vanes 19a, 19b and 20. Discharge segments 21 or takeoff wheels rotated on discharge drive shaft 22, which is also journaled in bearings on the machine frame 3, press the forward margin of each sheet against discharge idler roll 23 and move the blank on to subsequent operations of the envelope machine, for example. Discharge segments 21 rotate at a peripheral velocity greater than that of wheels 1a, 1b to withdraw each sheet from contact with pins 4 after each is properly aligned. This is before the pins begin to diverge and move down from the uppermost point of the wheel periphery.

Successively, feed segments 15 or feed wheels deliver another sheet to the alignment wheels. A second corresponding pair of pins 4 on the wheels (or for larger sheets, the same pair) engages the trailing edges of this sheet and transports it up around the path of the wheel periphery toward the convergent side of the wheels at which point it also has been centered upon the centering plane.

I claim:

1. An aligning mechanism for blanks of sheet material comprising a pair of non-parallel aligning wheels rotatable on axes lying within a common plane and intersecting at a point between said wheels, said wheels having a convergent side and a divergent side; at least a pair of corresponding alignment pins, one carried on the periphery of each of said wheels; means for rotating said aligning wheels in synchronism, the rotation of said wheels moving corresponding ones of said alignment pins toward a centering plane passing through the point of intersection of the rotational axes of said wheels and being perpendicular to the common plane which includes said axes; means feeding in succession a series of blanks to corresponding pins of said wheels at their divergent side; and means withdrawing each aligned blank at the convergent side of said wheels.

2. An alignment mechanism according to claim 1 wherein said wheels rotate on axles flexibly coupled at the intersecting point of their rotational axes.

3. An alignment mechanism according to claim 1 wherein said means withdrawing each aligned blank includes segment and idler roll means which rotate with a peripheral velocity greater than the peripheral velocity of said aligning wheels.

4. In an aligning mechanism for blanks of sheet material, the improvement which comprises a pair of non-parallel aligning wheels rotatable on axes lying within a common plane and intersetcing at a point between said wheels, said wheels having a convergent side and a divergent side; at least a pair of corresponding alignment pins, one carried on the periphery of each of said wheels; means for holding said blanks against the periphery of each of said wheels; and means for rotating said aligning wheels in synchronism, the rotation of said wheels moving corresponding ones of said pins toward a centering plane passing through the point of intersection of the rotational axes of said wheels and being perpendicular to the common plane which includes said axes.

5. In a sheet aligning mechanism for blanks of sheet material, the improvement which comprises a pair of non-parallel aligning wheels rotatable on non-parallel axes; at least a pair of corresponding alignment pins, one carried on the periphery of each wheel; resilient means for holding said blanks against the periphery of each of said wheels; and means for rotating said aligning wheels in synchronism, the rotation of said wheels periodically moving the pins of said pair of corresponding alignment pins toward a centering plane passing through the intersection of the planes defined by the path of travel of said pins.

References Cited

FOREIGN PATENTS 956,090  4/1964  Great Britain.

EDWARD A. SROKA, *Primary Examiner.*

U.S. Cl. X.R.

271—52